United States Patent
Goskonda et al.

(10) Patent No.: US 12,508,221 B2
(45) Date of Patent: *Dec. 30, 2025

(54) TOPICAL COMPOSITIONS AND METHODS OF USE

(71) Applicant: PS Therapy Ltd., Bridgetown (BB)

(72) Inventors: Venkat R. Goskonda, Phoenix, AZ (US); Ravi Nallakrishnan, Willowbrook, IL (US)

(73) Assignee: PS Therapy Ltd, Westmont, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/469,012

(22) Filed: Sep. 8, 2021

(65) Prior Publication Data

US 2022/0079873 A1    Mar. 17, 2022

Related U.S. Application Data

(60) Provisional application No. 63/077,255, filed on Sep. 11, 2020, provisional application No. 63/090,369, filed on Oct. 12, 2020.

(51) Int. Cl.
*A61K 31/167* (2006.01)
*A61K 9/00* (2006.01)
*A61K 9/06* (2006.01)
*A61K 47/10* (2017.01)
*A61K 47/44* (2017.01)

(52) U.S. Cl.
CPC .............. *A61K 9/0014* (2013.01); *A61K 9/06* (2013.01); *A61K 31/167* (2013.01); *A61K 47/10* (2013.01); *A61K 47/44* (2013.01)

(58) Field of Classification Search
None
See application file for complete search history.

(56) References Cited

U.S. PATENT DOCUMENTS

| | | | | |
|---|---|---|---|---|
| 5,358,715 A | * | 10/1994 | Wong | A61K 9/0014 424/449 |
| 2006/0153905 A1 | * | 7/2006 | Carrara | A61K 47/12 424/449 |
| 2010/0292199 A1 | * | 11/2010 | Leverd | A61K 47/14 514/178 |
| 2019/0262290 A1 | * | 8/2019 | Horn | A61K 47/10 |

OTHER PUBLICATIONS

Chessa et al (Effect of Penetration Enhancer Containing Vesicles on the Percutaneous Delivery of Quercetin through New Born Pig Skin. Pharmaceutics 2011, 3, 497-509) (Year: 2011).*
Naik et al (Mechanism of oleic acid-induced skin penetration enhancement in vivo in humans. Journal of Controlled Release 37 (1995) 299-306) (Year: 1995).*
Kouchak et al (Effects of Various Penetration Enhancers on Penetration of Aminophylline Through Shed Snake Skin. Jundishapur J Nat Pharm Prod. Feb. 2014; 9(1): 24-9) (Year: 2014).*
Karami et al (On iontophoretic delivery enhancement: Ionization and mobility of lidocaine hydrochloride in propylene glycol. International Journal of Pharmaceutics 168 (1998) 85-95) (Year: 1998).*

* cited by examiner

*Primary Examiner* — Jake M Vu
(74) *Attorney, Agent, or Firm* — Wood, Phillips, Katz, Clark & Mortimer

(57) ABSTRACT

The present invention is directed to a topical composition comprising one or more active ingredients and one or more permeation enhancers. The present invention is further directed to a method of reducing or eliminating one or more conditions selected from the group consisting of pain, hemorrhoids, acne, wrinkles and scars.

19 Claims, No Drawings

TOPICAL COMPOSITIONS AND METHODS OF USE

FIELD OF THE INVENTION

The present invention is directed to a topical composition comprising one or more active ingredients and one or more permeation enhancers. The present invention is further directed to a method of reducing or eliminating one or more conditions selected from the group consisting of pain, hemorrhoids, acne, wrinkles and scars.

BACKGROUND OF THE INVENTION

Human skin is composed of multiple layers. The outermost layer known as the stratum corneum is an effective barrier to most nano-sized particles. Because of this barrier efforts must be taken to develop compositions that can facilitate the penetration of the epidermis by active ingredients that need to be delivered to local tissues. Current topical compositions including analgesics, hemorrhoid treatments, acne treatments, anti-wrinkle compositions and anti-scar compositions all suffer from similar deficiencies regarding epidermal penetration.

Unformulated lidocaine has low skin permeability. Some recent efforts to create formulations to transport lidocaine across the epidermal barrier are detailed in United States Patent Application Publication No. 2020-061002 A2. However, given the widespread need for local anesthetic and the multitude of skin types further formulations efforts are warranted.

Thus, there is a need in the art for a topical composition that can increase permeation, safety and or efficacy of topical drugs.

SUMMARY OF THE INVENTION

The present invention is directed to a topical composition comprising one or more active ingredients and one or more permeation enhancers.

The present invention is further directed to a topical composition comprising one or more active ingredients, one or more nonionic surfactants, one or more viscosity enhancers.

The present invention is further directed to a method of reducing or eliminating one or more conditions selected from the group consisting of pain, hemorrhoids, acne, wrinkles and scars.

DETAILED DESCRIPTION OF THE INVENTION

Applicant has unexpectedly discovered novel formulations capable of providing superior skin permeation to topical active ingredients. Specifically, the unique permeation enhancers of the present invention provide epidermal penetration for topical active ingredients that were previously found difficult to permeate. Further, unique combinations of permeation enhancers, nonionic surfactants and viscosity enhancers may provide enhanced permeation.

In one embodiment, the present invention is directed to a topical composition comprising one or more active ingredients and one or more permeation enhancers.

In another embodiment, the present invention is further directed to a topical composition comprising one or more active ingredients, one or more nonionic surfactants, one or more viscosity enhancers and one or more permeation enhancers.

As used herein, active ingredients include but are not limited to topical analgesics such as lidocaine, prilocaine, tetracaine, non-steroidal anti-inflammatory drugs ("NSAIDs") such as diclofenac, capsaicin, methyl salicylate, menthol, camphor, wintergreen oil, eucalyptus oil, nonivamide, allantoin, zinc oxide, tocopherol acetate, salts thereof and mixtures thereof; hemorrhoid treatment compounds such as hydrocortisone, phenylephrine, pramoxine, salts thereof and mixtures thereof; acne treatment compounds such as benzoyl peroxide, salicylic acid, azelaic acid, dapsone, resorcinol, erythromycin, clindamycin, salts thereof and mixtures thereof; anti-wrinkle compounds such as retinoids including retinol, tretinoin, isotretinoin, alitretinoin, etretinate, acitretin, adapalene and tazarotene, vitamin C and alpha-hydroxy acids including glycolic acid, citric acid and lactic acid, coenzyme Q10, niacinamide, salts thereof and mixtures thereof; and anti-scar compounds such as *Allium cepa*, collagen, elastin and mixtures thereof.

In a preferred embodiment, the present invention is directed to a topical analgesic composition comprising one or more topical analgesics preferably selected from the group consisting of lidocaine prilocaine, tetracaine, NSAIDs, capsaicin, methyl salicylate, menthol, camphor, wintergreen oil, eucalyptus oil, nonivamide, allantoin, zinc oxide, tocopherol acetate, and salts thereof and one or more permeation enhancers preferably selected from the group consisting of cyclodextrins, oleic acid, lauryl laurate, lauryl alcohol, propylene glycol, propylene glycol monolaurate, propylene glycol monocaprylate, diethylene glycol monoethyl ether, caprylocaproyl polyoxyl-8 glycerides and isopropyl myristate.

In another preferred embodiment, the present invention is directed to a composition to reduce or eliminate hemorrhoids comprising one or more hemorrhoid treatment compounds preferably selected from the group consisting of hydrocortisone, phenylephrine, pramoxine and salts thereof, one or more surfactants, one or more viscosity enhancers and one or more permeation enhancers.

In another preferred embodiment, the present invention is directed to a composition to reduce or eliminate acne comprising one or more acne treatment compounds, preferably selected from the group consisting of benzoyl peroxide, salicylic acid, azelaic acid, dapsone, resorcinol, erythromycin, clindamycin and salts, one or more surfactants, one or more viscosity enhancers and one or more permeation enhancers.

In another preferred embodiment, the present invention is directed to a composition to reduce or eliminate skin wrinkles comprising one or more anti-wrinkle compounds, preferably selected from the group consisting of retinol, tretinoin, isotretinoin, alitretinoin, etretinate, acitretin, adapalene and tazarotene, vitamin C, glycolic acid, citric acid and lactic acid, coenzyme Q10, niacinamide and salts, one or more surfactants, one or more viscosity enhancers and one or more permeation enhancers.

In another preferred embodiment, the present invention is directed to a composition to reduce or eliminate scars comprising one or more anti-scar compounds, preferably selected from the group consisting of *Allium cepa*, collagen and elastin, one or more surfactants, one or more viscosity enhancers and one or more permeation enhancers.

In another preferred embodiment, the one or more topical active ingredients are at a concentration from about 0.001% to about 99% w/w.

Lidocaine may be present in topical compositions of the present invention at a concentration from about 0.1% to about 10% w/w, preferably from about 1% to about 7% w/w and more preferably from about 2% to about 4% w/w and most preferably at about 3% or 4% w/w.

Hydrocortisone may be present in topical compositions of the present invention at a concentration from about 0.1% to about 10% w/w, preferably from about 0.5% to about 5% w/w and more preferably from about 1% to about 2.5% w/w.

Phenylephrine hydrochloride may be present in topical compositions of the present invention at a concentration from about 0.01% to about 1% w/w, preferably from about 0.1% to about 0.5% w/w and more preferably from about 0.2% to about 0.3% w/w.

Pramoxine hydrochloride may be present in topical compositions of the present invention at a concentration from about 0.1% to about 10% w/w, preferably from about 0.5% to about 5% w/w and more preferably from about 1% to about 2.5% w/w.

Benzoyl peroxide may be present in topical compositions of the present invention at a concentration from about 0.1% to about 10% w/w, preferably from about 1% to about 5% w/w and more preferably from about 3% to about 4% w/w.

Salicylic acid may be present in topical compositions of the present invention at a concentration from about 1% to about 20% w/w, preferably from about 5% to about 15% w/w and most preferably about 10% w/w.

Erythromycin may be present in topical compositions of the present invention at a concentration from about 0.1% to about 10% w/w, preferably from about 1% to about 10% w/w and more preferably from about 1% to about 5% w/w.

Clindamycin may be present in topical compositions of the present invention at a concentration from about 0.1% to about 10% w/w, preferably from about 1% to about 10% w/w and more preferably from about 1% to about 5% w/w.

Azelaic acid may be present in topical compositions of the present invention at a concentration from about 1% to about 50% w/w, preferably from about 5% to about 40% w/w and more preferably from about 10% to about 20% w/w.

Dapsone may be present in topical compositions of the present invention at a concentration from about 1% to about 20% w/w, preferably from about 1% to about 10% w/w and more preferably from about 4% to about 6% w/w.

Resorcinol may be present in topical compositions of the present invention at a concentration from about 1% to about 20% w/w, preferably from about 1% to about 10% w/w and more preferably from about 1% to about 5% w/w.

Vitamin C may be present in topical compositions of the present invention at a concentration from about 1% to about 30% w/w, preferably from about 5% to about 20% w/w and more preferably from about 5% to about 15% w/w.

Alpha-hydroxy acids may be present in topical compositions of the present invention at a concentration from about 1% to about 80% w/w, preferably from about 5% to about 70% w/w and more preferably from about 10% to about 70% w/w.

Coenzyme Q10 may be present in topical compositions of the present invention at a concentration from about 0.1% to about 10% w/w, preferably from about 1% to about 5% w/w and more preferably from about 1% to about 3% w/w.

Niacinamide may be present in topical compositions of the present invention at a concentration from about 1% to about 30% w/w, preferably from about 5% to about 20% w/w and more preferably from about 5% to about 15% w/w.

Collagen may be present in topical compositions of the present invention at a concentration from about 1% to about 99% w/w, preferably from about 1% to about 90% w/w.

Elastin may be present in topical compositions of the present invention at a concentration from about 1% to about 99% w/w, preferably from about 1% to about 90% w/w.

Retinoids may be present in topical compositions of the present invention at a concentration from about 0.01% to about 10% w/w, preferably from about 0.1% to about 5% w/w and more preferably from about 0.1% to about 3% w/w.

In another embodiment, one or more nonionic surfactants may be present in the topical compositions of the present invention. Nonionic surfactants suitable for use in the present invention include, but are not limited to, poloxamers, polysorbates, alkylaryl polyethers, polyoxyethyleneglycol alkyl ethers, tyloxapol, and polyoxyls.

Poloxamers are nonionic triblock copolymers composed of a central hydrophobic chain of polyoxypropylene (poly (propylene oxide)) flanked by two hydrophilic chains of polyoxyethylene (poly(ethylene oxide)) including, but not limited to, poloxamer 188 and poloxamer 407.

Polysorbates are oily liquids derived from ethoxylated sorbitan esterified with fatty acids including, but not limited to, polysorbate 20, polysorbate 60, polysorbate 80 such as Tween® 20, Tween® 60, Tween® 80 (Tween is a registered trademark of and available from Uniqema Americas LLC), sorbitan monolaurate, sorbitan monopalmitate, sorbitan monostearate, and sorbitan monooleate such as Span® 20, Span® 40, Span® 60 and Span® 80 (Span is a registered trademark of and available from Uniqema Americas LLC).

Polyoxyls include, but are not limited to, polyoxyl 40 stearate, polyoxyl 30 castor oil, polyoxyl 35 castor oil, polyoxyl 40 hydrogenated castor oil and polyoxyethylene glycol alkyl ethers such as Brij® 35, Brij® 78, Brij® 98 and Brij® 700 (Brij is a registered trademark of and available from Croda Americas LLC), In a more preferred, the one or more nonionic surfactants are poloxamer 407, poloxamer 188 and polyoxyl 35 castor oil.

Nonionic surfactants may be present in compositions of the present invention at a total concentration from about 1.0% to about 7.0% w/w, more preferably from about 1% to about 2% w/w and most preferably at about 1.45% w/w.

In another embodiment, one or more viscosity enhancers may be present in topical compositions of the present invention. Viscosity enhancers suitable for use in the present invention include, but are not limited to, cellulose derivatives, gums, dextrans, polyvinyl alcohol, polyacrylic acids, povidone, polyethylene glycol, propylene glycol, chitosans, and hyaluronates and hyaluronic acids.

Cellulose derivatives include, but are not limited to, hydroxypropylmethyl cellulose, hydroxypropyl cellulose, carboxymethyl cellulose including sodium salts thereof, methyl cellulose, methyl cellulose 4000, hydroxymethyl cellulose, carboxypropylmethyl cellulose, hydroxypropylethyl cellulose, and hydroxyethyl cellulose.

Polyacrylic acids include, but are not limited to, carbomers such as carbomer 910, 934, 940 and 974P such as Carbopol® 900 series (Carbopol is a registered trademark of and available from Lubrizol Advanced Materials, Inc.).

In a more preferred embodiment, the one or more viscosity enhancers of the topical compositions of the present invention are selected from the group consisting of sodium carboxymethyl cellulose and carbomer 974P.

Viscosity enhancers may be present in compositions of the present invention at a concentration from about 0.1% to about 10.0% w/w, more preferably from about 0.5% to about 2% w/w and most preferably at about 1% w/w.

In a preferred embodiment, the one or more permeation enhancers are selected from the group consisting of cyclodextrins, oleic acid, lauryl laurate, lauryl alcohol, propylene glycol, propylene glycol monolaurate, propylene glycol monocaprylate, diethylene glycol monoethyl ether, caprylocaproyl polyoxyl-8 glycerides and isopropyl myristate. In a more preferred embodiment, the one or more permeation enhancers are selected from the group consisting of oleic acid, lauryl laurate, lauryl alcohol, a mixture of lauryl alcohol and propylene glycol at a 1:9 ratio and a mixture of propylene glycol monolaurate and propylene glycol at a 1:9 ratio and in an even more preferred embodiment, the one or more permeation enhancers are selected from the group consisting of lauryl laurate, lauryl alcohol, a mixture of lauryl alcohol and propylene glycol at a 1:9 ratio and a mixture of propylene glycol monolaurate and propylene glycol at a 1:9 ratio.

Cyclodextrins are composed of 5 or more α-D-glucopyranoside units linked together at position 1 and 4 including, but not limited to, cyclodextrins-2-HP-cyclodextrin, ionically charged (e.g. anionic) beta-cyclodextrins with or without a butyrated salt (Captisol®; (sulfobutylether β-cyclodextrin, Captisol is a registered trademark of Cydex Pharmaceuticals), hydroxypropyl-gamma-cyclodextrin and gamma cyclodextrin.

Permeation enhancers may be present in compositions of the present invention at a concentration from about 0.1% to about 10.0% w/w, more preferably from about 2% to about 5% w/w and most preferably at about 2% or 3% w/w.

In another embodiment, the topical compositions of the present invention further comprise one or more excipients selected from the group consisting of co-solvents and cooling agents.

Co-solvents that may be used in compositions of the present invention include, but are not limited to, ethanol, propylene glycol, isopropyl alcohol, benzyl alcohol and polyethylene glycol.

Benzyl alcohol may be present in compositions of the present invention at a concentration from about 1% to about 20% w/w, preferably from about 5% to about 15% w/w and most preferably at about 10% w/w.

Ethanol may be present in compositions of the present invention at a concentration from about 1% to about 10% w/w, preferably from about 4% to about 6% w/w and most preferably at about 5% w/w.

Polyethylene glycol may be present in compositions of the present invention at a concentration from about 0.1% to about 10% w/w, preferably from about 0.1% to about 1% w/w and most preferably at about 0.5% w/w. In a preferred embodiment, the polyethylene glycol is polyethylene glycol 400.

Isopropyl alcohol may be present in compositions of the present invention at a concentration from about 1% to about 10% w/w, preferably from about 4% to about 6% w/w and most preferably at about 5% w/w.

Cooling agents that may be used in compositions of the present invention include, but are not limited to, menthol and esters thereof.

Menthol may be present in compositions of the present invention at a concentration from about 0.1% to about 10% w/w, preferably from about 0.1% to about 1% w/w and most preferably at about 0.75% w/w.

Water may be present in compositions of the present invention at a concentration from about 50% to about 99% w/w, preferably from about 75% to about 90% w/w and most preferably at about 79.3%, 80.3%, 84.8% or 85.8% w/w.

In another embodiment, the present invention is directed to a method of reducing or eliminating pain comprising applying a composition of the present invention to a subject in need thereof.

In another embodiment, the present invention is directed to a method of reducing or eliminating hemorrhoids comprising applying a composition of the present invention to a subject in need thereof.

In another embodiment, the present invention is directed to a method of reducing or eliminating acne comprising applying a composition of the present invention to a subject in need thereof.

In another embodiment, the present invention is directed to a method of reducing or eliminating wrinkles comprising applying a composition of the present invention to a subject in need thereof.

In another embodiment, the present invention is directed to a method of reducing or eliminating scars comprising applying a composition of the present invention to a subject in need thereof.

In another embodiment, the present invention is directed to a method of treating gastrointestinal conditions or diseases comprising applying a composition of the present invention to a subject in need thereof.

As used herein, the term "composition" is intended to encompass a product comprising the specified ingredients in the specified amounts, as well as any product which results, directly or indirectly, from a combination of the specified ingredients in the specified amounts.

Compositions of the present invention may be applied by any topical means known in the art including as a liquid, gel, ointment, cream or transdermal patch.

As used herein, "effective amount" of the composition refers to a sufficient amount of the composition to provide the desired effect. The amount of the composition may vary depending on specific condition, specific subject and other factors.

The active ingredients of the present invention can be used in the form of salt derived from inorganic or organic acids or bases. Acid addition salts of the active ingredients of the present invention can be prepared in situ during the final isolation and purification of the compounds of the invention or separately by reacting a free base function with a suitable organic acid. Representative acid addition salts include, but are not limited to, acetate, adipate, alginate, citrate, aspartate, benzoate, benzenesulfonate, bisulfate, butyrate, camphorate, camphorsulfonate, digluconate, glycerophosphate, hemisulfate, heptanoate, hexanoate, fumarate, hydrochloride, hydrobromide, hydroiodide, 2-hydroxyethansulfonate (isothionate), lactate, maleate, methanesulfonate, nicotinate, 2-naphthalenesulfonate, oxalate, palmitoate, pectinate, persulfate, 3-phenylpropionate, picrate, pivalate, propionate, succinate, tartrate, thiocyanate, phosphate, glutamate, bicarbonate, p-toluenesulfonate and undecanoate. Also, the basic nitrogen-containing groups can be quaternized with such agents as lower alkyl halides such as methyl, ethyl, propyl, and butyl chlorides, bromides and iodides; dialkyl sulfates like dimethyl, diethyl, dibutyl and diamyl sulfates; long chain halides such as decyl, lauryl, myristyl and stearyl chlorides, bromides and iodides; arylalkyl halides like benzyl and phenethyl bromides and others. Water or oil-soluble or dispersible products are thereby obtained. Examples of acids which can be employed to form acid addition salts include such inorganic acids as hydrochloric acid, hydrobromic acid, hyaluronic acid, malic acid, sulphuric acid and phosphoric acid and such organic acids as oxalic acid, malic acid, maleic acid, methanosulfonic acid, succinic acid and citric acid. Basic addition salts can be prepared in situ during the final isolation and purification of compounds of this invention by reacting a carboxylic acid-containing moiety with a suitable base such as the hydroxide, carbonate or bicarbonate of a pharmaceutically acceptable metal cation or with ammonia or an organic primary, secondary or tertiary amine. Salts include, but are not limited to, cations based on alkali metals or alkaline earth metals such as lithium, sodium, potassium, calcium, magnesium and aluminum salts and the like and nontoxic quaternary ammonia and amine cations including ammonium, tetramethylammonium, tetraethylammonium, methylammonium, dimethylammonium, trimethylammonium, triethylammonium, diethylammonium, and ethylammonium among others. Other representative organic amines useful for the formation of base addition salts include ethylenediamine, ethanolamine, diethanolamine, piperidine, piperazine and the like.

As used herein, all numerical values relating to amounts, weights, and the like, that are defined as "about" each particular value is plus or minus 10%. For example, the phrase "about 5% w/w" is to be understood as "4.5% to 5.5% w/w." Therefore, amounts within 10% of the claimed value are encompassed by the scope of the claims.

As used herein "% w/w" refers to the percent weight of the total composition.

As used herein the term "subject" refers but is not limited to a person or other animal.

Throughout the application, the singular forms "a," "an," and "the" include plural reference unless the context clearly dictates otherwise.

TABLE 1

| (% w/w) | #1 | #2 | #3 | #4 | #5 | #6 | #7 |
|---|---|---|---|---|---|---|---|
| Lidocaine | 3.50 | 3.50 | 3.50 | 3.50 | 3.50 | 4.00 | 4.00 |
| Ethanol | 5.00 | 5.00 | 5.00 | 5.00 | 5.00 | 5.00 | 5.00 |
| Poloxamer 407 | 1.00 | 1.00 | 1.00 | 1.00 | 1.00 | 1.00 | 1.00 |
| Poloxamer 188 | 0.20 | 0.20 | 0.20 | 0.20 | 0.20 | 0.20 | 0.20 |
| Polyoxyl 35 Castor Oil | 0.25 | 0.25 | 0.25 | 0.25 | 0.25 | 0.25 | 0.25 |
| Oleic Acid | 2.00 | — | — | — | — | 2.00 | — |
| Lauryl laurate | — | 3.00 | — | — | — | — | — |
| Lauryl alcohol | — | — | 3.00 | — | — | — | — |
| Lauryl alcohol:Propylene glycol (1:9 ratio) | — | — | — | 3.00 | — | — | — |
| Propylene glycol monolaurate:Propylene glycol (1:9 ratio) | — | — | — | — | 3.00 | — | 3.00 |
| PEG 400 | 0.50 | 0.50 | 0.50 | 0.50 | 0.50 | 0.50 | 0.50 |
| Menthol | 0.75 | 0.75 | 0.75 | 0.75 | 0.75 | 0.75 | 0.75 |
| Sodium carboxymethyl cellulose | 1.00 | 1.00 | 1.00 | 1.00 | 1.00 | — | — |
| Carbomer 974P | — | — | — | — | — | 1.00 | 1.00 |
| Isopropyl Alcohol | — | — | — | — | — | 5.00 | 5.00 |
| Water | 85.80 | 84.80 | 84.80 | 84.80 | 84.80 | 80.30 | 79.30 |

| (% w/w) | #8 | #9 | #10 |
|---|---|---|---|
| Lidocaine | 4.00 | 4.00 | 4.00 |
| Benzyl Alcohol | 10.00 | 10.00 | 10.00 |
| Poloxamer 407 | 1.00 | 1.00 | 1.00 |
| Poloxamer 188 | 0.20 | 0.20 | 0.20 |
| Polyoxyl 35 Castor Oil | 0.25 | 0.25 | 0.25 |
| Propylene glycol monolaurate:Propylene glycol (1:9 ratio) | 3.00 | 3.00 | 3.00 |
| Diethylene glycol monoethyl ether | — | 1.00 | 1.00 |
| Caprylocaproyl polyoxyl-8 glycerides | — | — | 1.00 |
| PEG 400 | 0.50 | 0.50 | 0.50 |
| Menthol | 0.75 | 0.75 | 0.75 |
| Carbomer 974P | 1.00 | 1.00 | 1.00 |
| Isopropyl Alcohol | 5.00 | 5.00 | 5.00 |
| Water | 74.3 | 73.3 | 72.3 |

Transcutol® P was used as the source of diethylene glycol monoethyl ether (Transcutol is a registered trademark of and available from Gattefosse S.A. Joint Stock Company).

Labrasol® was used as the source of caprylocaproyl polyoxyl-8 glycerides (Labrasol is a registered trademark of and available from Gattefosse S.A. Joint Stock Company).

EXAMPLES

Example 1—In-Vitro Permeation Study

Aspercreme® is a 4% lidocaine hydrochloride cream that further contains acrylates/C10-30 alkyl acrylate crosspolymer, aloe barbadensis leaf juice, aminomethyl propanol, C30-45 alkyl cetearyl dimethicone crosspolymer, caprylyl methicone, cetearyl alcohol, ceteth-20 phosphate, dicetyl phosphate, dimethicone, disodium EDTA, ethylhexylglycerin, glyceryl stearate, phenoxyethanol, SD alcohol 40, steareth-21 and water. Aspercreme is a registered trademark of and available from Chattem, Inc.

Salonpas® Lidocaine Plus Cream ("Salonpas® Cream") is a 4% lidocaine and 10% benzyl alcohol formulation further containing aloe barbadensis leaf juice, aminomethyl propanol, butylene glycol, carbomer copolymer, cetearyl alcohol, ceteth phosphate, dicetyl phosphate, dimethicone, hydroxy carylate/sodium acryloyldimethyl taurate copolymer, polysorbate, glyceryl monostearate, squalene, SD alcohol 40-B, steareth and water. Salonpas® is a registered trademark of and available from Hisamitsu Pharmaceutical Co., Inc.

Salonpas® Patch contains a 4% lidocaine formulation containing aluminum silicate, dihydroxyaluminum aminoacetate, disodium edetate, gelatin, glycerin, methyparaben, oleic acid, polyacrylic acid, polyvinyl alcohol, propylene glycol, propylparaben, sodium polyacrylate, tartaric acid, titanium dioxide and water.

Method

Prehydrated human skin membrane was mounted between the donor and receptor compartments. Formulations #6, #7 and #8 from Table 1, above, and Aspercreme® (4% lidocaine), Salonpas® Patch (4% lidocaine) and Salonpas® Cream (4% lidocaine) were placed on the human skin surface in the donor compartment. The receptor compartment was filled up with a receptor medium and the solution was continuously stirred using a magnetic stirring bar. Samples were taken out from the receptor compartment sampling port at predetermined time intervals, and fresh solution was immediately injected into the sampling port to replace samples which were drawn earlier. The concentration of lidocaine in each sample was measured by high performance liquid chromatography and the drug flux was determined for the formulations. Results of this study are shown in Table 2, below.

TABLE 2

|  | Average Cumulative Amount Permeated for 24 hours (mg) | Average Flux (µg/cm² * hour) | Average Flux Ratio with Aspercreme® | Average Flux Ratio with Salonpas® Cream | Average Flux Ratio with Salonpas® Patch |
|---|---|---|---|---|---|
| Aspercreme® | 0.429 ± 0.063 | 30.4 ± 5.6 | — | — | — |
| Salonpas® Cream | 0.272 ± 0.036 | 18.7 ± 2.3 | — | — | — |
| Salonpas® Patch | 0.093 ± 0.010 | 6.6 ± 0.8 | — | — | — |
| Formulation #6 | 0.422 ± 0.062 | 31.3 ± 4.1 | 1.03 | 1.67 | 4.74 |
| Formulation #7 | 0.642 ± 0.055 | 45.5 ± 3.6 | 1.5 | 2.43 | 6.89 |
| Formulation #8 | 0.385 ± 0.052 | 28.7 ± 3.6 | 0.94 | 1.54 | 4.35 |

Results

As seen in Table 2, Formulations #6 and #7 of the present formulation are better than Aspercreme®, Salonpas® Cream and Salonpas® Patch at providing permeation of lidocaine through a human skin membrane. Specifically, Formulation #7 provided 1.5 times better average flux than Aspercreme®. Formulation #8 is better than Salonpas® Cream and Salonpas® Gel Patch at providing permeation of lidocaine through a human skin membrane.

Example 3—In-Vitro Permeation Study (Prophetic)

Method

Prehydrated human skin membrane was mounted between the donor and receptor compartments. Formulations #9 and #10 from Table 1, above, and Aspercreme® (4% Lidocaine) were placed on the human skin surface in the donor compartment. The receptor compartment was filled up with a receptor medium and the solution was continuously stirred using a magnetic stirring bar. Samples were taken out from the receptor compartment sampling port at predetermined time intervals, and fresh solution was immediately injected into the sampling port to replace samples which were drawn earlier. The concentration of lidocaine in each sample was measured by high performance liquid chromatography and the drug flux was determined for the formulations.

Results

Formulations #9 and #10 of the present formulation are as good or better than Aspercreme® at providing permeation of lidocaine through a human skin membrane.

What is claimed is:

1. A topical composition comprising lidocaine or a salt thereof, one or more nonionic surfactants, one or more viscosity enhancers, a mixture of propylene glycol monolaurate and propylene glycol at a ratio of about 1:9 and ethanol.

2. The composition of claim 1, wherein the one or more nonionic surfactants are selected from the group consisting of poloxamers, polysorbates, cyclodextrins, alkylaryl polyethers, polyoxyethyleneglycol alkyl ethers, tyloxapol, and polyoxyls.

3. The composition of claim 2, wherein the one or more nonionic surfactants are selected from the group consisting of poloxamer 188, poloxamer 407, polysorbate 20, polysorbate 60, polysorbate 80, sorbitan monolaurate, sorbitan monopalmitate, sorbitan monostearate, sorbitan monooleate, 2-HP-cyclodextrin, sulfobutylether β-cyclodextrin, hydroxypropyl-gamma-cyclodextrin, polyoxyl 40 stearate, polyoxyl 30 castor oil, polyoxyl 35 castor oil, polyoxyl 40 hydrogenated castor oil and polyoxyethylene glycol alkyl ethers.

4. The composition of claim 3, wherein the one or more nonionic surfactants are selected from the group consisting of poloxamer 407, poloxamer 188 and polyoxyl 35 castor oil.

5. The composition of claim 1, wherein the one or more viscosity enhancers are selected from the group consisting of cellulose derivatives, gums, dextrans, polyvinyl alcohol, polyacrylic acids, povidone, polyethylene glycol, propylene glycol, chitosans, and hyaluronates and hyaluronic acids.

6. The composition of claim 5, wherein the one or more viscosity enhancers are selected from the group consisting of cellulose derivatives and polyacrylic acids.

7. The composition of claim 6, wherein the one or more viscosity enhancers are selected from the group consisting of sodium carboxymethyl cellulose and carbomer 974P.

8. The composition of claim 1, further comprising one or more excipients selected from the group consisting of co-solvents and cooling agents.

9. The composition of claim 8, wherein the one or more excipients are selected from the group consisting of polyethylene glycol 400, menthol and isopropyl alcohol.

10. A method of reducing or eliminating one or more conditions selected from the group consisting of pain, hemorrhoids, acne, wrinkles and scars comprising topically applying an effective amount of a composition of claim 1 to a subject in need thereof.

11. A method of treating gastrointestinal conditions or diseases comprising applying a composition of claim 1 to a subject in need thereof.

12. A topical analgesic composition comprising lidocaine or a salt thereof and a mixture of propylene glycol monolaurate and propylene glycol at a ratio of about 1:9, and ethanol.

13. The composition of claim 12, further comprising one or more surfactants and one or more viscosity enhancers.

14. The composition of claim 13, wherein the one or more nonionic surfactants are selected from the group consisting of poloxamer 407, poloxamer 188 and polyoxyl 35 castor oil.

15. The composition of claim 13, wherein lidocaine or a salt thereof is at a concentration from about 2% to about 4% w/w, the one or more nonionic surfactants are at a total concentration from about 1% to about 2% w/w, the one or more viscosity enhancers are at a concentration from about 0.5% to about 2% w/w and the mixture of propylene glycol monolaurate and propylene glycol at ratio of about 1:9 is at a concentration from about 2% to about 5% w/w.

16. A method of reducing or eliminating pain, hemorrhoids or a combination thereof comprising topically applying an effective amount of a composition of claim 12 to a subject in need thereof.

17. A method of treating gastrointestinal conditions or diseases comprising applying a composition of claim 12 to a subject in need thereof.

18. A topical analgesic composition comprising:
   about 4.0% w/w lidocaine;
   about 1.0% w/w poloxamer 407;
   about 0.2% w/w poloxamer 188;
   about 0.25% w/w polyoxyl 35 castor oil;
   about 3.0% w/w of a mixture of propylene glycol monolaurate and propylene glycol at a ratio of about 1:9; and
   about 1.0% w/w carbomer 974P, and about 5.0% w/w ethanol.

19. The composition of claim 18, further comprising;
   about 5% w/w isopropyl alcohol;
   about 0.75% w/w menthol; and
   about 0.5% w/w polyethylene glycol 400.

\* \* \* \* \*